(12) United States Patent
Sunaga et al.

(10) Patent No.: US 8,774,321 B2
(45) Date of Patent: Jul. 8, 2014

(54) CLOCK DATA RECOVERY CIRCUIT AND CLOCK DATA RECOVERY METHOD

(75) Inventors: Kazuhisa Sunaga, Tokyo (JP); Kouichi Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 302 days.

(21) Appl. No.: 13/394,801

(22) PCT Filed: Sep. 7, 2010

(86) PCT No.: PCT/JP2010/065273
§ 371 (c)(1),
(2), (4) Date: Mar. 7, 2012

(87) PCT Pub. No.: WO2011/030740
PCT Pub. Date: Mar. 17, 2011

(65) Prior Publication Data
US 2012/0170692 A1    Jul. 5, 2012

(30) Foreign Application Priority Data

Sep. 9, 2009  (JP) .................................. 2009-208203

(51) Int. Cl.
*H04L 27/00*    (2006.01)
(52) U.S. Cl.
USPC ............ 375/324; 375/322; 329/311; 455/214
(58) Field of Classification Search
None
See application file for complete search history.

(56) References Cited

U.S. PATENT DOCUMENTS

| | | |
|---|---|---|
| 5,789,988 A | 8/1998 | Sasaki |
| 6,519,303 B1 | 2/2003 | Matsuda et al. |
| 6,930,628 B2 * | 8/2005 | Reinhold et al. ............... 341/155 |
| 2005/0031341 A1 * | 2/2005 | Stuart ............................... 398/26 |
| 2009/0220249 A1 * | 9/2009 | Mizuguchi ..................... 398/202 |

FOREIGN PATENT DOCUMENTS

| | | |
|---|---|---|
| JP | 62-178038 A | 8/1987 |
| JP | 9-247229 A | 9/1997 |
| JP | 2000-232492 A | 8/2000 |
| JP | 2004-064469 A | 2/2004 |
| JP | 2010-074506 A | 4/2010 |

OTHER PUBLICATIONS

International Search Report in PCT/JP2010/065273 dated Nov. 30, 2010 (English Translation Thereof).
A. Amirkhany et al., "A 24 Gb/s Software Programmable Analog Multi-Tone Transmitter," IEEE Journal of Solid-State Circuits, vol. 43, No. 4, p. 999-1009, Apr. 2008.

\* cited by examiner

*Primary Examiner* — Shuwang Liu
*Assistant Examiner* — Gina McKie
(74) *Attorney, Agent, or Firm* — McGinn IP Law Group, PLLC

(57) ABSTRACT

A clock data recovery circuit includes: a demodulation filter that receives a transmission signal transmitted by two orthogonal carrier waves having I and Q phases and executes demodulation to obtain a demodulated wave having an phase and a demodulated wave having a Q phase from the transmission signal; a first determination circuit that determines whether an absolute value of one of the two demodulated waves is greater than an eye opening maximum value at an ideal clock phase of the transmission signal; a second determination circuit that determines whether the one demodulated wave is greater than zero; a third determination circuit that determines whether the other one of the two demodulated waves is greater than zero; and a phase comparison unit that detects whether a phase of a clock signal included in the transmission signal is leading a phase of a data signal included in the transmission signal, based on determination results obtained by the first to third determination circuits.

11 Claims, 18 Drawing Sheets

TRUTH TABLE (WHEN DI = 1)

| DI | DQ | EI | UP | DN |
|----|----|----|----|----|
| 1  | 1  | 1  | -1 | 1  |
| 1  | 1  | -1 | 1  | -1 |
| 1  | -1 | 1  | 1  | -1 |
| 1  | -1 | -1 | -1 | 1  |

$$UP = DI \cdot (\overline{DQ} \cdot EI + DQ \cdot \overline{EI}), \quad DN = \overline{UP}$$

FIG. 17

$$\text{BASEBAND} \qquad fch.1 = (+1,+1,+1,+1)\begin{pmatrix} Xe_0 \\ Xe_1 \\ Xe_2 \\ Xe_3 \end{pmatrix}$$

$$\text{MEDIUM FREQUENCY BAND (I)} \qquad fch.2I = (+1,+1,-1,-1)\begin{pmatrix} Xe_0 \\ Xe_1 \\ Xe_2 \\ Xe_3 \end{pmatrix}$$

$$\text{MEDIUM FREQUENCY BAND (Q)} \qquad fch.2Q = (+1,-1,-1,+1)\begin{pmatrix} Xe_0 \\ Xe_1 \\ Xe_2 \\ Xe_3 \end{pmatrix}$$

$$\text{HIGH FREQUENCY BAND} \qquad f(ch.3) = (+1,-1,+1,-1)\begin{pmatrix} Xe_0 \\ Xe_1 \\ Xe_2 \\ Xe_3 \end{pmatrix}$$

CLOCK DATA RECOVERY CIRCUIT AND CLOCK DATA RECOVERY METHOD

REFERENCE TO RELATED APPLICATION

This application is based upon and claims the benefit of the priority of Japanese patent application No. 2009-208203 filed on Sep. 9, 2009, the disclosure of which is incorporated herein in its entirety by reference thereto.

TECHNICAL FIELD

The present invention relates to a clock data recovery circuit and a clock data recovery method. In particular, it relates to a clock data recovery circuit and a clock data recovery method used when frequency division multiplexing is executed in high-speed serial wire communication.

BACKGROUND

In recent years, in the field of high-speed serial wire communication, research and development on faster communication interfaces is conducted. For example, standardization of high-speed interchip communication interfaces realizing a rate exceeding 10 Gb/s has been started. In high-speed serial communication, transmission-line loss depends on frequency, and inter-symbol interference (ISI) is caused. As a result, an eye pattern at a data reception end of a receiver is distorted. It is known that the bit error rate is increased in such case. This is attributable to the fact that binary transmission is a mainstream trend and a higher data rate is thus achieved by increasing the clock frequency.

To inhibit ISI-related waveform degradation by reducing a transmitted symbol frequency and to improve a data rate, Non-Patent Document 1 discloses an analog multi-tone (AMT) technique as a large-capacity wire transmission method based on frequency division multiplexing using carrier waves.

The transmission system disclosed in Non-Patent Document 1 is an 18 Gb/s level transmission system in which four channels of signals having a 3 Gb/s symbol width are multiplexed and transmitted in three frequency bands. Feed forward equalizers (FFEs) in the transmission circuit include finite impulse response (FIR) filters by digital signal processing. These FFEs execute waveform equalization. In addition, the FFEs execute upconversion to a 3 GHz band and a 6 GHz band on a plurality of baseband signals. In particular, by using two carrier waves having I and Q phases orthogonal to each other in the 3 GHz band, the FFEs multiplex two data in the single frequency band. To multiplex 3 Gb/s symbols on the four channels, the FFEs execute oversampling at a rate four times the 3 Gb/s symbol width and control waveforms at such timing. As illustrated in FIG. 2, as an equalized reception waveform, a 12 Gb/s eye opening is obtained at a symbol rate 3 Gb/s.

Non-Patent Document 1:
A. Amirkhany et al., "A 24 Gb/s Software Programmable Analog Multi-Tone Transmitter," IEEE Journal of Solid-State Circuits, vol. 43, no. 4, p. 999-1009, April 2008

SUMMARY

The entire disclosure of the above Non-Patent Document 1 is incorporated herein by reference thereto. The following analyses are given by the present invention.

In general high-speed serial communication, clock information is superimposed on transmission data, and a clock data recovery (CDR) circuit is arranged on the receiving side. The clock data recovery circuit recovers a clock phase from the transmission data on which the clock information is superimposed. The received data is over-sampled at a timing twice as large as a symbol rate. Based on the sampling result, the clock data recovery circuit adjusts the clock phase to a data transition timing (edge). The oversampling timing of the clock adjusted to such edge is positioned at the center between both edges of a data symbol. Thus, the data can be sampled accurately at the center of a data eye opening. However, such clock data recovery method is on the premise that an edge timing is distributed around the center of each of the continuous data eyes.

However, in frequency division multiplexing, a data eye pattern as shown in FIG. 2 is obtained at a receiving end. In FIG. 2, ¾ or more of the symbol section is not obtained as an eye opening. Thus, since an edge timing cannot be extracted by such conventional clock data recovery technique, a clock phase cannot be made suitable.

Therefore, there is a demand that a clock phase needs to be made suitable from a receiving-end waveform in high-speed wire communication using frequency division multiplexing.

According to a first aspect of the present invention, there is provided a clock data recovery circuit, comprising:
a demodulation filter that receives a transmission signal transmitted by two orthogonal carrier waves having I and Q phases and executes demodulation to obtain a demodulated wave having an I phase and a demodulated wave having a Q phase from the transmission signal;
a first determination circuit that determines whether an absolute value of one of the two demodulated waves is greater than an eye opening maximum value at an ideal clock phase of the transmission signal;
a second determination circuit that determines whether the one demodulated wave is greater than zero;
a third determination circuit that determines whether the other one of the two demodulated waves is greater than zero; and
a phase comparison unit that detects whether a phase of a clock signal included in the transmission signal is leading a phase of a data signal included in the transmission signal, based on determination results obtained by the first to third determination circuits.

According to a second aspect of the present invention, there is provided A clock data recovery method, comprising:
receiving a transmission signal transmitted by two orthogonal carrier waves having I and Q phases and executing demodulation to obtain a demodulated wave having an I phase and a demodulated wave having a Q phase from the transmission signal;
first determining whether an absolute value of one of the two demodulated waves is greater than an eye opening maximum value at an ideal clock phase of the transmission signal;
second determining whether the one demodulated wave is greater than zero;
third determining whether the other one of the two demodulated waves is greater than zero; and detecting whether a phase of a clock signal included in the transmission signal is leading a phase of a data signal included in the transmission signal, based on determination results obtained by the first to third determinings.

The present invention provides the following advantage, but not restricted thereto. Based on the clock data recovery circuit and clock data recovery method according to the present invention, a clock phase can be made suitable from a receiving-end waveform in high-speed wire communication using frequency division multiplexing.

BRIEF DESCRIPTION OF THE DRAWINGS

FIG. 17 illustrates coefficients of demodulation filters in demodulation units for the individual channels according to the example.

PREFERRED MODES

Figure 1:
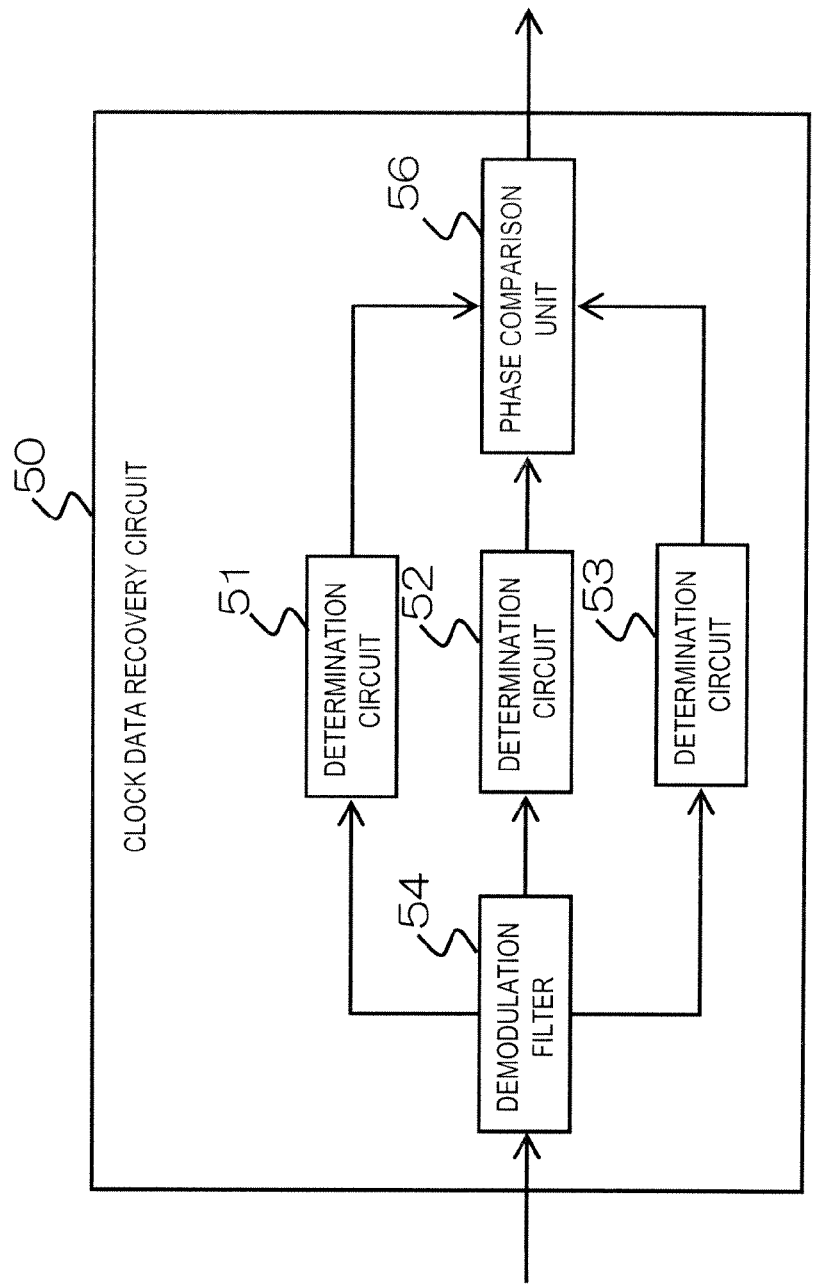
FIG. 1 is a block diagram illustrating a configuration of a clock data recovery circuit according to an exemplary embodiment.

In the present disclosure, there are various possible modes, which include the following, but not restricted thereto.

A clock data recovery circuit in a first applicable mode may be the clock data recovery circuit according to the above first aspect.

In a clock data recovery circuit in a second applicable mode, when the second determination circuit obtains a determination result, based on whether a determination result obtained by the first determination circuit and a determination result obtained by the third determination circuit are the same, the phase comparison unit may detect whether the phase of the clock signal is leading the phase of the data signal.

A clock data recovery circuit in a third applicable mode may further comprise a phase control unit that controls the phase of the clock signal based on a detection result obtained by the phase comparison unit.

In a clock data recovery circuit in a fourth applicable mode, if the phase comparison unit detects that the phase of the clock signal is leading the phase of the data signal, the phase control unit may delay the phase of the clock signal. In addition, if the phase comparison unit detects that the phase of the clock signal is lagging the phase of the data signal, the phase control unit may advance the phase of the clock signal.

A clock data recovery method in a fifth applicable mode may be the clock data recovery method according to the above second aspect.

In a clock data recovery method in a sixth applicable mode, when a determination result is obtained in the second determining, based on whether a determination result obtained in the first determining and a determination result obtained in the third determining are the same, whether the phase of the clock signal is leading the phase of the data signal may be detected in the detecting.

A clock data recovery method in a seventh applicable mode may further comprise controlling the phase of the clock signal based on a detection result obtained in the detecting.

In a clock data recovery method in an eighth applicable mode, if it is detected that the phase of the clock signal is leading the phase of the data signal in the detecting, the phase of the clock signal may be delayed in the controlling. In addition, if it is detected that the phase of the clock signal is lagging the phase of the data signal in the detecting, the phase of the clock signal may be advanced in the controlling.

In a clock data recovery circuit in a ninth applicable mode, it is preferable that, when a determination result obtained by the second determination circuit either true or false, if one of the determination results obtained by the first and third determination circuits is true and the other is false, the phase comparison unit may detect that the phase of the clock signal is lagging the phase of the data signal and that, otherwise, the phase comparison unit may detect that the phase of the clock signal is leading the phase of the data signal.

Exemplary Embodiment

A clock data recovery circuit according to an exemplary embodiment will be described with reference to the drawings. FIG. 1 is a block diagram illustrating a clock data recovery circuit 50 according to the present exemplary embodiment. In FIG. 1, the clock data recovery circuit 50 includes a demodulation filter 54, a first determination circuit 51, a second determination circuit 52, a third determination circuit 53, and a phase comparison unit 56.

The demodulation 54 receives a transmission signal transmitted by two orthogonal carrier waves having I and Q phases and executes demodulation to obtain a demodulated wave having an I phase and a demodulated wave having a Q phase from the transmission signal.

Between the two demodulated waves, the first determination circuit 51 determines whether an absolute value of a first demodulated wave (for example, the demodulated wave having an I phase) is greater than an eye opening maximum value at an ideal clock phase of the transmission signal. The second determination circuit 52 determines whether the first demodulated wave (for example, the demodulated wave having an I phase) is greater than zero. The third determination circuit 53 determines whether a second demodulated wave (for example, the demodulated wave having a Q phase) of the two demodulated waves is greater than zero.

The phase comparison unit 56 detects whether a phase of a clock signal included in the transmission signal is leading a phase of a data signal included in the transmission signal, based on determination results obtained by the first to third determination circuits (51 to 53). When the second determination circuit 52 obtains a determination result (for example, when the one demodulated wave is greater than zero), based on whether a determination result obtained by the first determination circuit 51 and a determination result obtained by the third determination circuit 53 are the same, the phase comparison unit 56 may detect whether the phase of the clock signal is leading the phase of the data signal.

The clock data recovery circuit 50 may further include a phase control unit 58. The phase control unit 58 controls the phase of the clock signal based on a detection result obtained by the phase comparison unit 56. It is preferable that, if the phase comparison unit 56 detects that the phase of the clock signal is leading the phase of the data signal, the phase control unit 58 delay the phase of the clock signal. In addition, it is preferable that, if the phase comparison unit 56 detects that the phase of the clock signal is lagging the phase of the data signal, the phase control unit 58 advance the phase of the clock signal.

Example

A clock data recovery circuit according to an example will be described with reference to drawings. While signal lines in the drawings are illustrated based on single-end signaling, the following example will be described based on differential signaling.

Figure 2:
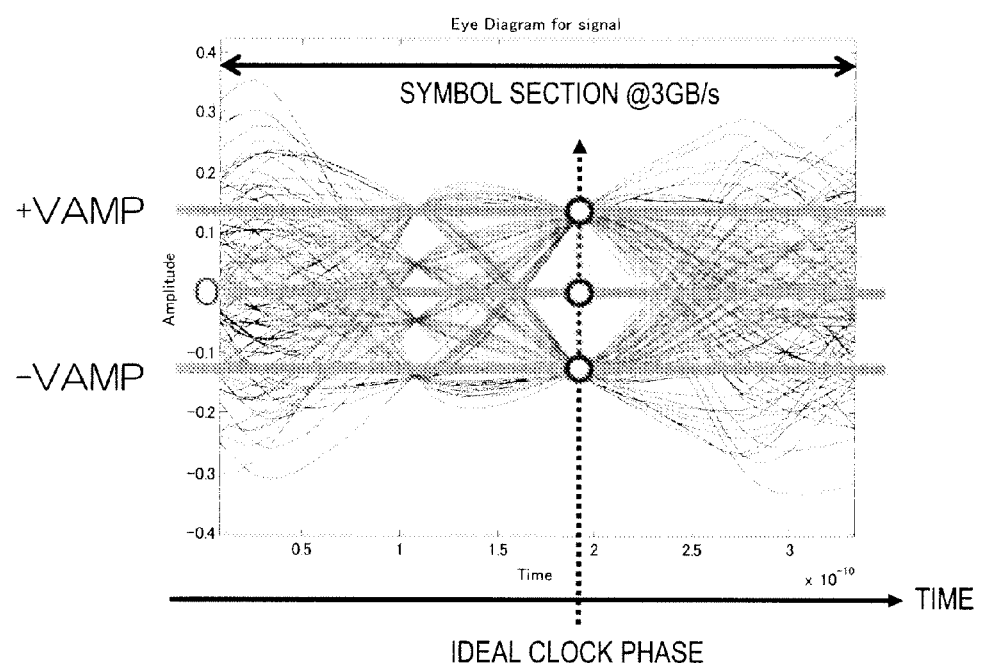
FIG. 2 illustrates VAMP, an ideal clock phase, and an eye pattern obtained after a Ch.2(I) demodulation filter.

This example will be described, assuming that optimization of waveform equalization by feed forward equalizers (FFEs) has already been completed at an ideal clock phase and that a maximum amplitude value (VAMP, −VAMP) at the clock phase has already been obtained, as illustrated in FIG. 2.

Figure 3A:
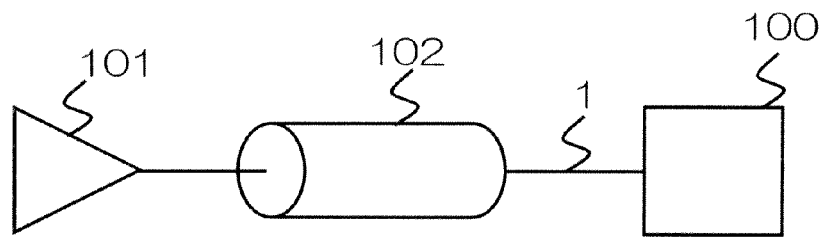
FIG. 3A is a block diagram illustrating a configuration of a communication system according to an example and FIG. 3B illustrates band allocation during frequency multiplexing.
Figure 3B:
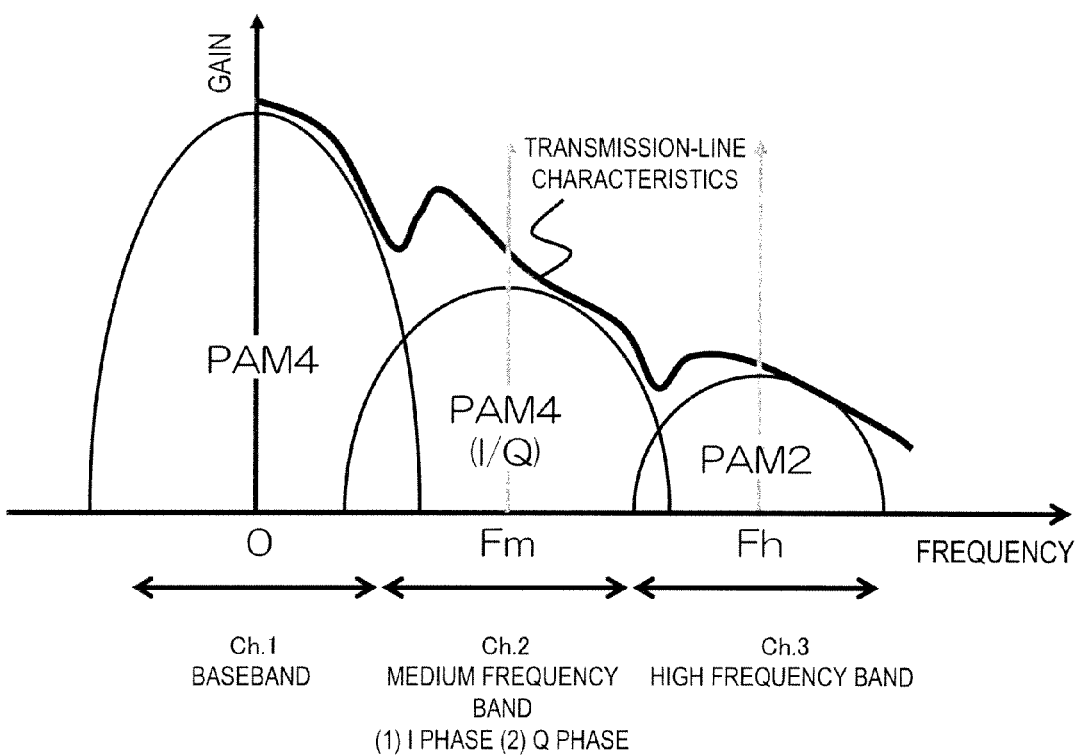

FIG. 3A is a block diagram illustrating a configuration of a communication system according to the present example. FIG. 3B illustrates band allocation during frequency multiplexing. The following description illustrates a clock data recovery method used when signals are transmitted by three frequency band channels of a baseband (Ch.1), a medium frequency band (Ch.2), and a high frequency band (Ch.3) illustrated in FIG. 3B. As described above, by using carrier waves having the I and Q phases orthogonal to each other, two types of different signals can be transmitted simultaneously in a single frequency band. The present example will be described, assuming that two types of signals are transmitted simultaneously in the medium frequency band (Ch.2). Hereinafter, a channel using a main-phase carrier wave to transmit a signal is the I phase (Ch.2(I)) and a channel orthogonal thereto is the Q phase (Ch.2(Q)).

Figure 4:
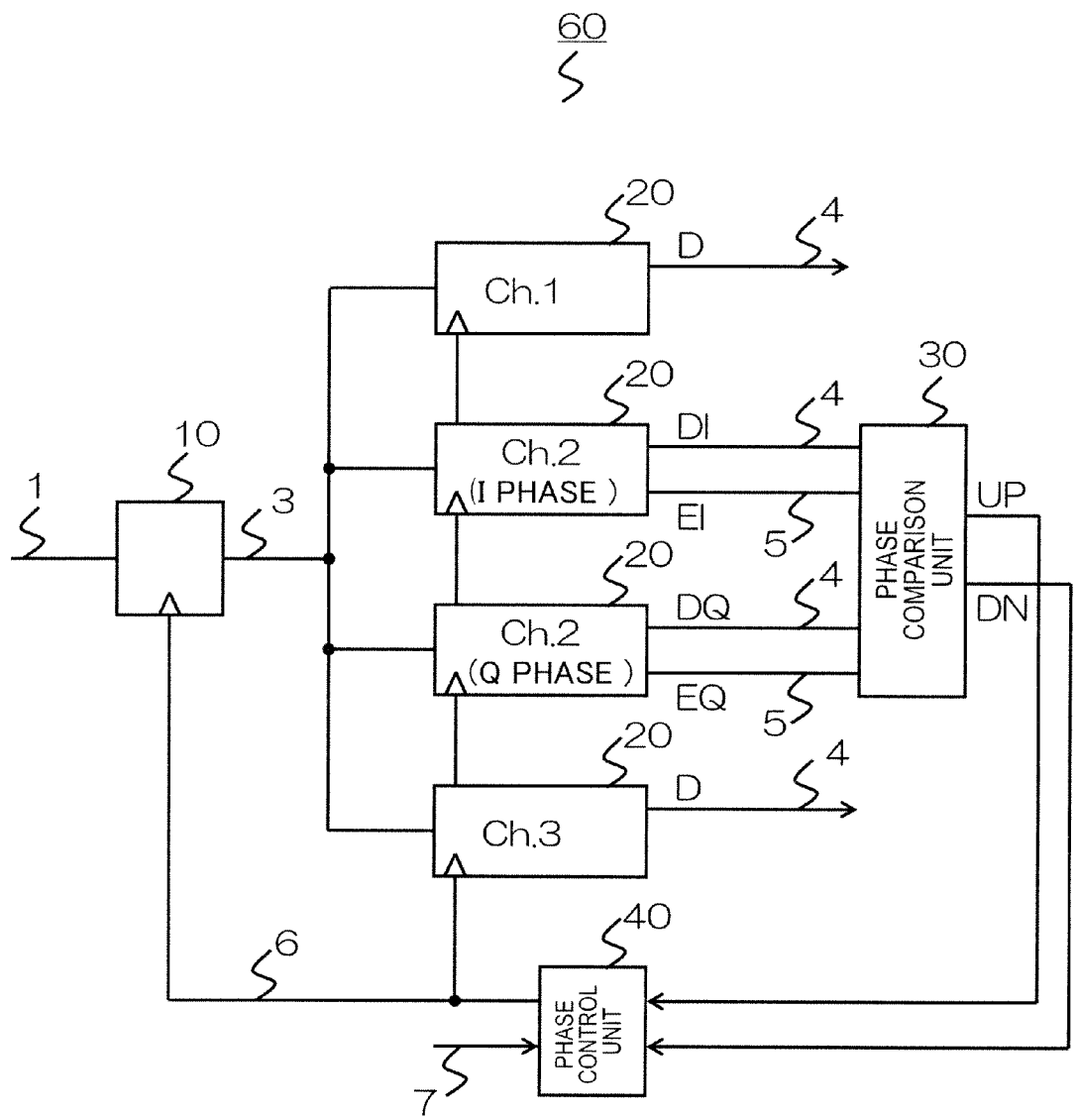
FIG. 4 is a block diagram illustrating a configuration of a clock data recovery circuit according to an example.

FIG. 4 is a block diagram illustrating a configuration of a clock data recovery circuit 60 according to the present example. In FIG. 4, the clock data recovery circuit 60 includes a data sampling unit 10, a plurality of demodulation units 20, a phase comparison unit 30, and a phase control unit 40.

As illustrated in FIG. 4, to recover a clock phase, the clock data recovery circuit 60 uses two types of signals 4 (DI, DQ) and signals 5 (EI, EQ) outputted from the demodulation units 20 arranged for the two orthogonal channels Ch.2(I) and Ch.2(Q).

Figure 5:
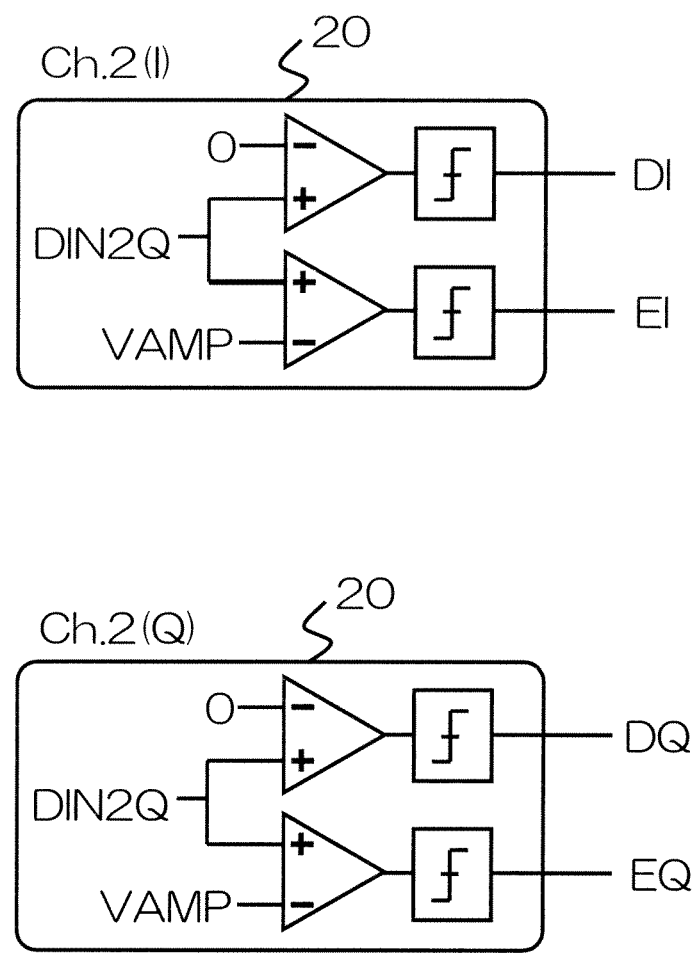
FIG. 5 illustrates two data sampling thresholds for a medium frequency band and outputs obtained based on the thresholds.

FIG. 5 illustrates two data sampling thresholds for the medium frequency band (Ch.2(I/Q)) and outputs obtained based on the thresholds. In FIG. 5, the signals 4 (DI, DQ) and 5 (EI, EQ) are data determined based on the two determination thresholds (0, VAMP) in the demodulation units 20 arranged for the channel Ch.2(I) and Ch.2(Q). The signals 4 (DI, DQ) are data signals (D) determined based on a differential threshold 0. On the other hand, the signals 5 (EI, EQ) are error signals (E) determined based on a differential threshold VAMP. The demodulation unit 20 arranged for the channel Ch.2(I) outputs the signals DI and EI, and the demodulation unit 20 arranged for the channel Ch.2(Q) outputs the signals DQ and EQ.

Figure 6:
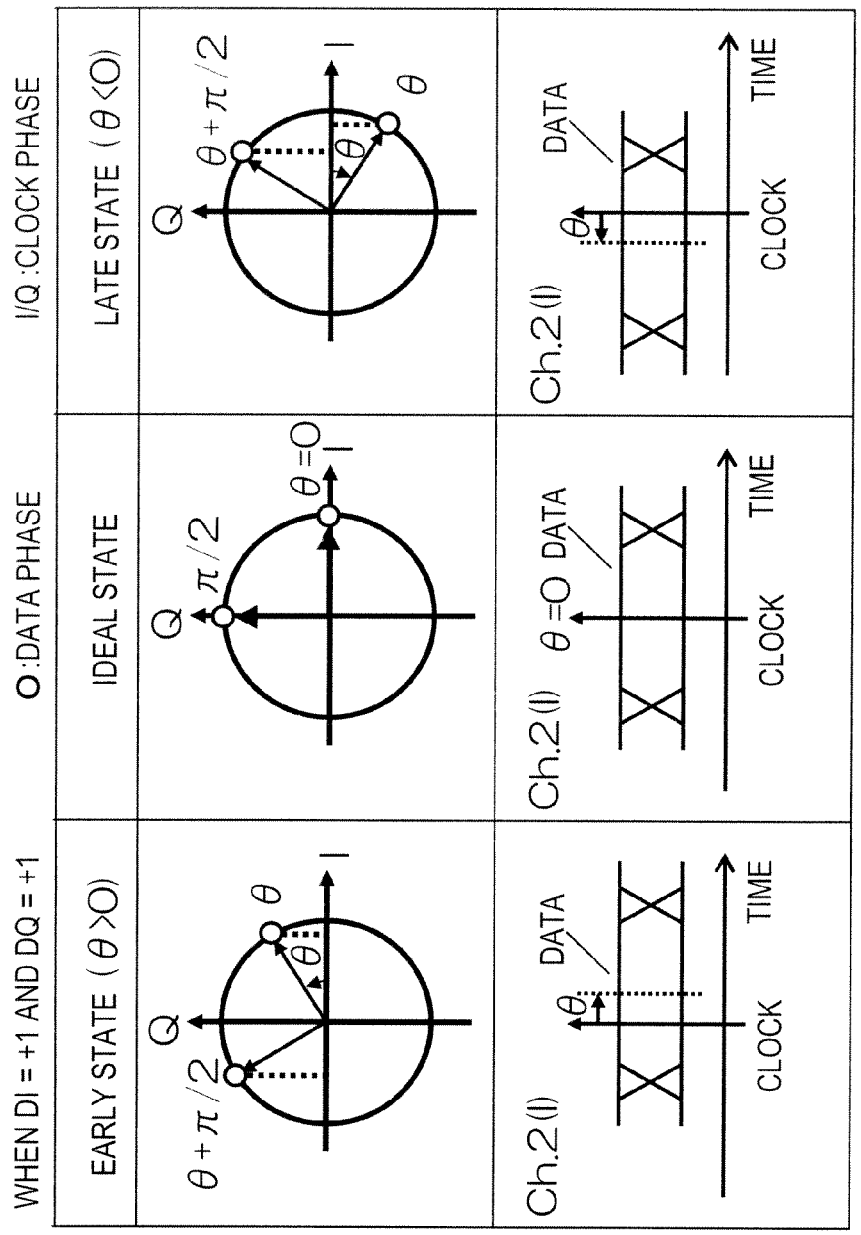
FIG. 6 illustrates relationships between a clock phase and a data phase in the medium frequency band.

FIG. 6 illustrates relationships between a clock signal phase and a data signal phase in the medium frequency band (Ch.2(I/Q)). FIG. 6 illustrates a constellation (an early state) in which the data phase (the data signal phase) is lagging the clock phase (the clock signal phase) and a constellation (a late state) in which the data phase is leading the clock phase. The amplitude appearing in the channel Ch.2(I) is represented by a value on the I axis in each constellation. The amplitude is the sum of cosines of the I and Q phases. On the other hand, the amplitude appearing in the channel Ch.2(Q) is represented by a value on the Q axis in each constellation. The amplitude is the sum of sines of the I and Q phases.

In this example, a method of adjusting a clock phase by monitoring the amplitude appearing in the channel Ch.2(I) will be described. The same operation principle is used when the amplitude appearing in the channel Ch.2(Q) is monitored. As the following expression (1) shows, the amplitude appearing in the channel Ch.2(I) is the sum of cosines of the I and Q phases.

$$AMP\_Ch.2(I)(DI = +1, DQ = +1) = VAMP \cdot \{\cos(\theta) + \cos(\theta + \pi/2)\} \quad (1)$$
$$= VAMP \cdot \{\cos(\theta) - \sin(\theta)\}$$

In expression (1), VAMP is an eye opening maximum value at an ideal clock phase (see FIG. 2). Based on expression (1), if the clock phase is shifted from the ideal state, the amplitude appearing in the channel Ch.2(I) changes depending on the difference θ between the clock phase and the data phase.

Figure 7:
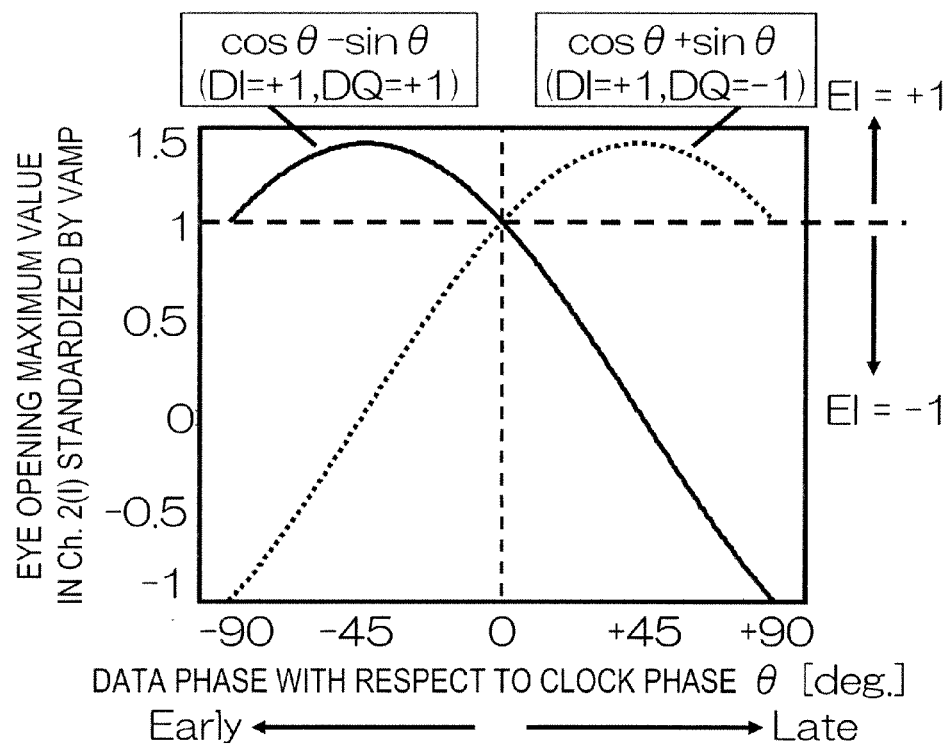
FIG. 7 illustrates a phase and an error signal output amplitude (when DI=+1).

FIG. 7 illustrates a phase and an error signal output amplitude (when DI=+1). A solid line in FIG. 7 represents expression (1) plotted over the phase difference θ. The solid line in FIG. 7 is plotted over the phase difference θ from −90 degrees to +90 degrees. When the phase difference θ is negative, the amplitude normalized by VAMP exceeds 1, and when the phase difference θ is positive, the amplitude normalized by VAMP falls below 1. Thus, data determination results (EI) obtained based on the threshold VAMP can be used as a phase error signal for adjusting the clock phase.

Expression (1) corresponds to a case where the differential determination data DI and DQ is +1 and +1, respectively, obtained based on the threshold zero in the channel Ch.2(I). On the other hand, when DI=+1 and DQ=−1, the Q phase further advances from (θ+π/2) by π to (θ+3π/2). In this case, the amplitude appearing in the channel Ch.2(I) is represented by expression (2) as the sum of cosines of the I and Q phases.

$$AMP\_Ch.2(I)(DI = +1, DQ = -1) = VAMP \cdot \{\cos(\theta) + \cos(\theta + 3\pi/2)\} \quad (2)$$
$$= VAMP \cdot \{\cos(\theta) + \sin(\theta)\}$$

A dotted line in FIG. 7 represents expression plotted over the phase difference θ. The dotted line representing expression (2) and the solid line representing expression (1) are symmetrical about the phase θ=0. Thus, as in the case of DQ=+1, when DQ=−1, EI can also be used as a phase error signal.

Figures 8A, 8B:
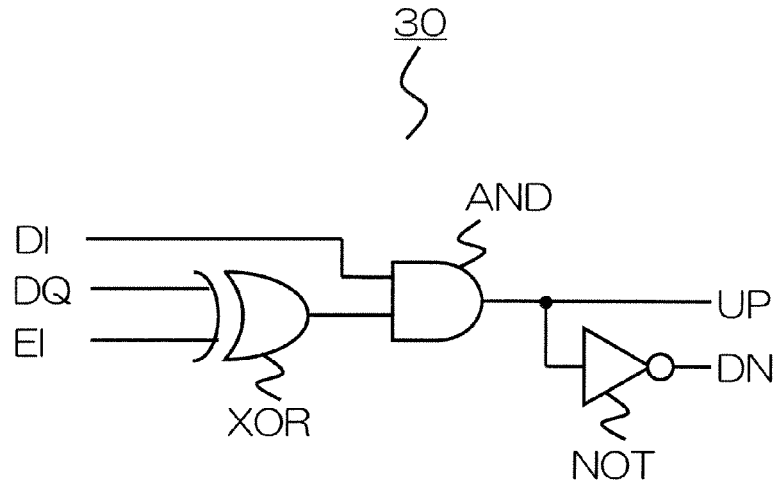
FIG. 8A is a truth table of clock data recovery UP/DN signals and FIG. 8B is a circuit diagram illustrating a configuration of a phase comparison unit according to the example.

FIG. 8A is a truth table of clock data recovery up/down (UP/DN) signals. As can be seen from the above description, depending on values of the output signals DI, DQ, and EI of the channels Ch.2(I) and Ch.2(Q), a truth table indicating clock-phase adjustment directions (UP) and (DN) as in FIG. 8A is obtained.

FIG. 8B is a circuit diagram illustrating a configuration of the phase comparison unit 30 according to the present example. In FIG. 8B, the phase comparison unit 30 includes an XOR gate XOR, an AND gate AND, and a NOT gate NOT. The XOR gate XOR receives the signals DQ and EI and outputs results of an XOR operation to the AND gate AND. The AND gate AND receives the signal DI and the output signal from the XOR gate XOR and outputs results of an AND operation as a signal UP. The NOT gate NOT receives the output signal from the AND gate, inverts the logic of the signal, and outputs the inverted logic signal as a signal DN. The phase comparison unit 30 enables clock data recovery, based on such simple logic circuit using the XOR gate XOR, the AND gate AND, and the NOT gate NOT.

Likewise, when DI=−1, expressions (3) and (4) are obtained.

$$AMP\_Ch.2(I)(DI = -1, DQ = +1) = \qquad (3)$$
$$-VAMP \cdot \{\cos(\theta) + \sin(\theta)\} = -1 \cdot AMP\_Ch.2(I)(DI = +1, DQ = -1)$$

$$AMP\_Ch.2(I)(DI = -1, DQ = -1) = \qquad (4)$$
$$-VAMP \cdot \{\cos(\theta) - \sin(\theta)\} = -1 \cdot AMP\_Ch.2(I)(DI = +1, DQ = +1)$$

Figure 9:
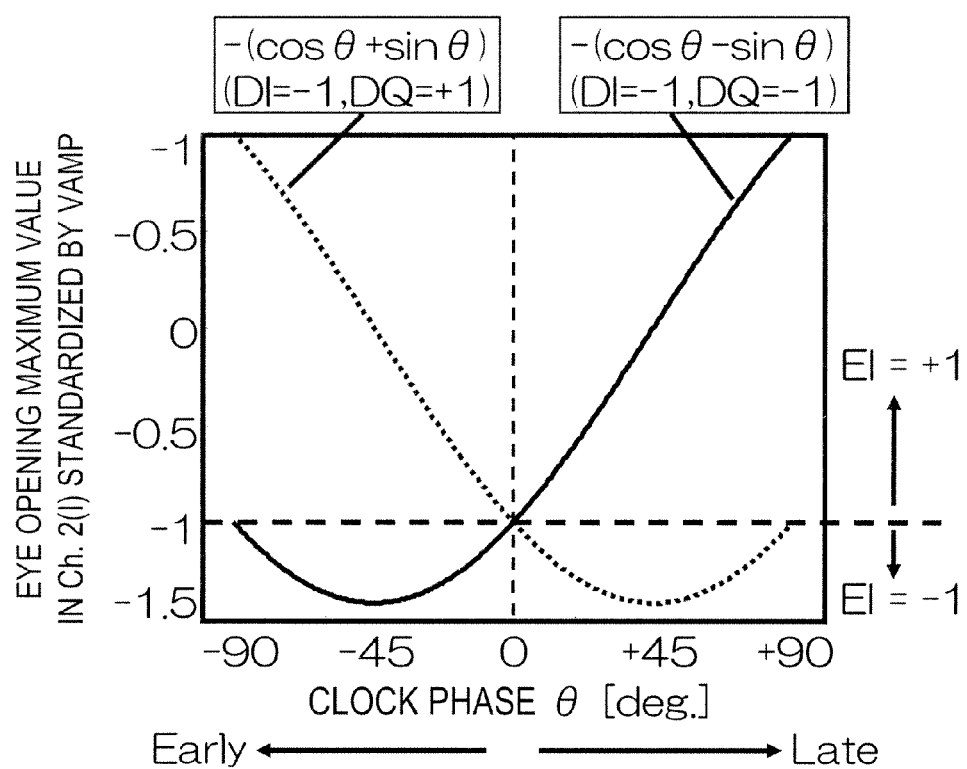
FIG. 9 illustrates a phase and an error signal output amplitude (when DI=−1).

FIG. 9 illustrates a phase and an error signal output amplitude (when DI=−1). As illustrated in FIG. 9, when DI=−1, determination results are obtained by using −VAMP as a differential threshold. In this way, as in the case of DI=+1, clock data recovery can be executed. Thus, by monitoring all combinations of the Ch.2(I) and Ch.2(Q) data signals, clock data can be recovered accurately during frequency division multiplexing. In addition, based on the clock data recovery circuit 60 according to the present example, since data at all the timings can be used, better tracking capabilities can be obtained, as compared with general clock data recovery using oversampling.

The example of the clock data recovery circuit 60 will be described in more detail with reference to the drawings.

In FIG. 3A, data (transmission signal) transmitted from a transmission circuit 101 including feed forward equalizers (FFEs) passes through a transmission line 102 and is supplied to a reception circuit 100 as an input multiple signal 1. The data transmission is executed in the three frequency bands of the baseband, the medium frequency band, and the high frequency band illustrated in FIG. 3B. As long as a single frequency band includes channels having the two orthogonal I and Q phases for transmitting two types of data, data may be transmitted by using more frequency bands or a single frequency band alone. In the present example, data is transmitted by using the I and Q phases in the medium frequency band.

In the present example, the demodulation units 20 use a discrete time process to process the input multiple signal 1. As illustrated in FIG. 4, the data sampling unit 10 executes oversampling on the supplied input multiple signal 1 at a rate four times greater than a symbol rate, and the oversampled data is supplied in parallel to the four demodulation units 20, each of which has a filter for a corresponding channel.

The demodulation units 20, each of which corresponds to a channel, use respective channel filters to execute a demodulation process and output data signals 4 sampled by the differential threshold zero necessary for clock data recovery. After receiving data transmitted by the channels Ch.2(I) and Ch.2(Q), the two demodulation units 20 (the two demodulation units positioned in the middle in FIG. 4) also output phase error signals 5 sampled by the differential threshold VAMP. The data signals 4 and the phase error signals 5 obtained from the channels Ch.2(I) and Ch.2(Q) are supplied to the phase comparison unit 30.

The phase comparison unit 30 generates up/down signals (UP/DN signals) for controlling the clock phase and outputs these signals to the phase control unit 40.

The phase control unit 40 receives the UP/DN signal and adjusts a phase of a recovery clock 6 with respect to a reference phase of a reference clock 7. For example, a conventional phase interpolator used in binary transmission can be used as the phase control unit 40.

Figure 10:
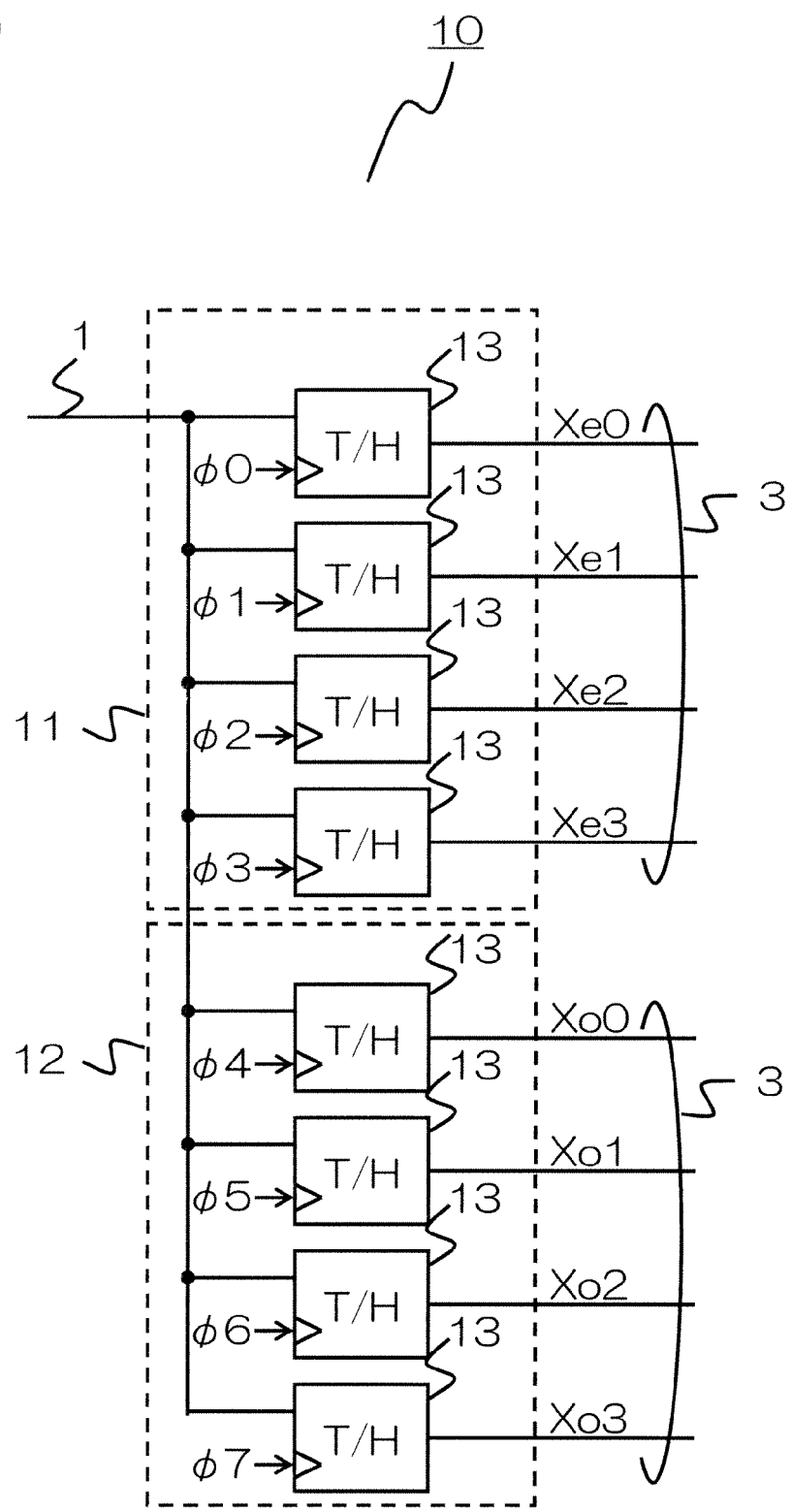
FIG. 10 is a block diagram illustrating a configuration of a data sampling unit according to the example.

FIG. 10 is a block diagram illustrating a configuration of the data sampling unit 10 according to the present example. The data sampling unit 10 in FIG. 10 is an interleaved-type data sampling unit. In FIG. 10, after a termination process, the input multiple signal 1 is subjected to data sampling in an even data sampling unit 11 and an odd data sampling unit 12 in an interleaved manner. The even data sampling unit 11 executes four-times oversampling at an oversampling width fourth times greater than a symbol rate for $\phi 0$ to $\phi 3$ of the 8-phase clock. Similarly, the odd data sampling unit 12 executes four-times oversampling for $\phi 4$ to $\phi 7$ of the 8-phase clock. The data sampling is executed in track-and-hold circuits (T/H) 13.

Figure 11:
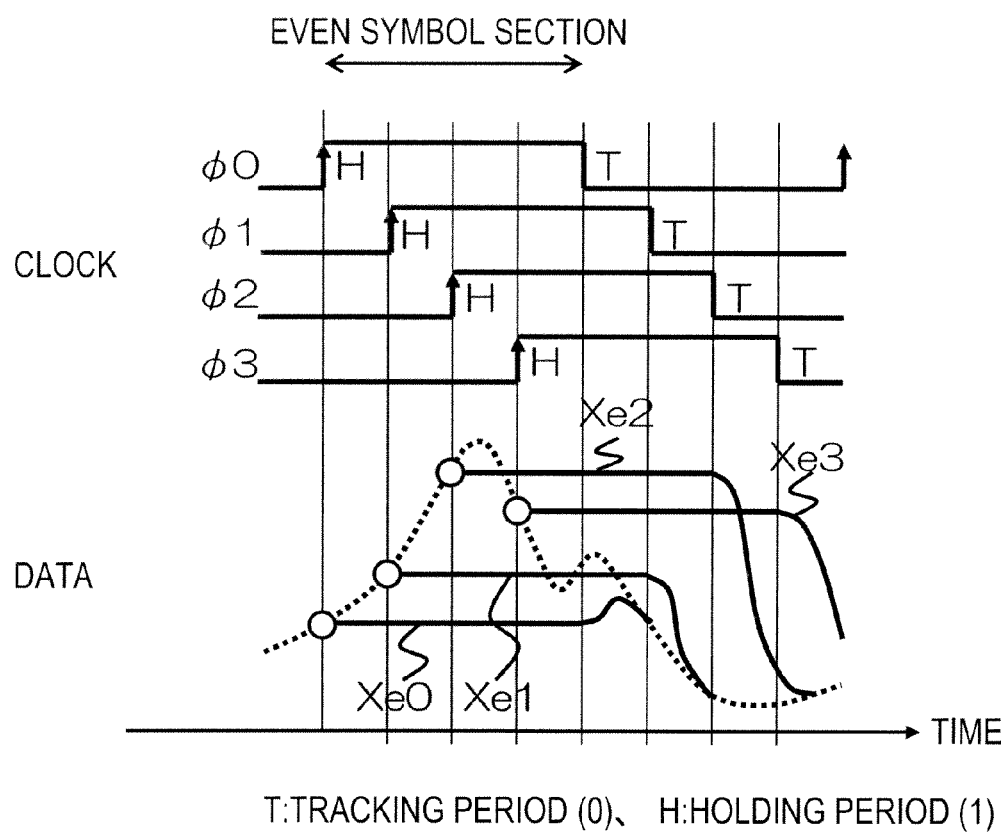
FIG. 11 is a timing chart illustrating an operation of an even data sampling unit according to the example.

FIG. 11 is a timing chart illustrating an operation of the even data sampling unit 11. As illustrated in FIG. 11, a tracking operation and a holding operation are switched depending on the clock level.

Figure 12:
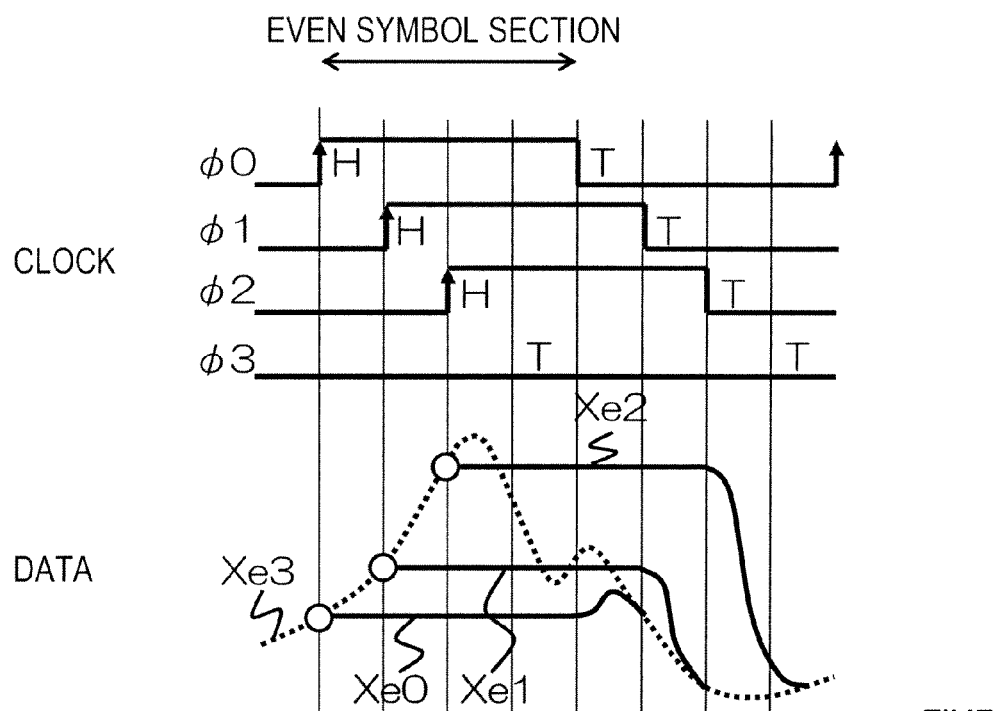
FIG. 12 is a timing chart illustrating an operation of an even data sampling unit according to the example (in case of through operation).

FIG. 12 is a timing chart illustrating an operation of the even data sampling unit 11 (in case of through operation). As illustrated in FIG. 12, while a tracking operation is maintained at timing $\phi 3$, the same effect can be obtained. The oversampled data 3 (Xe0 to Xe3) from the even data sampling unit 11 and the oversampled data 3 (Xo0 to Xo3) from the odd data sampling unit 12 is supplied to the demodulation units 20 (see FIG. 4) corresponding to the respective channels. The data is then demodulated.

Figure 13:
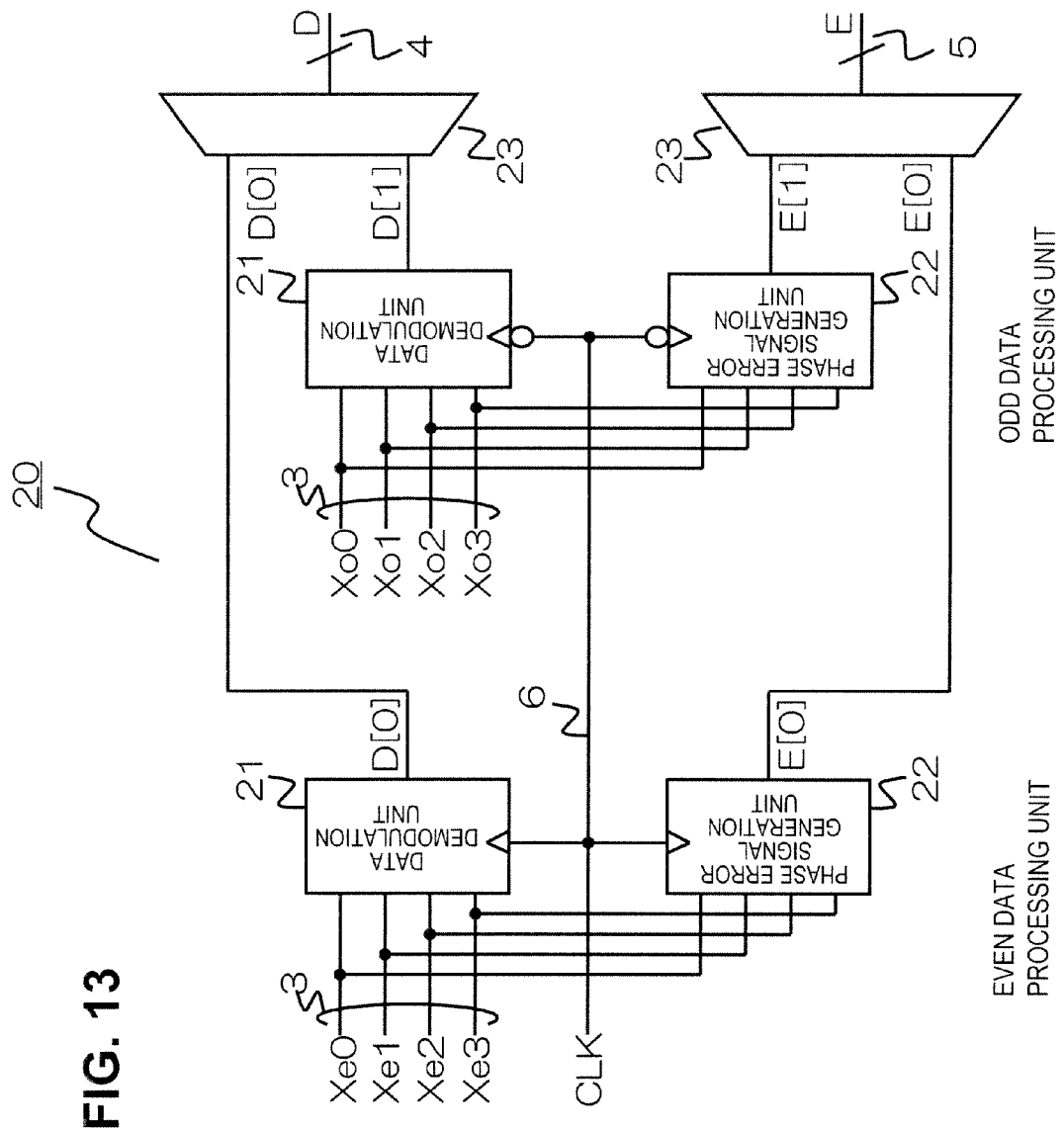
FIG. 13 is a circuit diagram illustrating a configuration of a demodulation unit according to the example.

FIG. 13 is a circuit diagram illustrating a configuration of a demodulation unit 20 according to the present example. In FIG. 13, the demodulation unit 20 includes two pairs of a data demodulation unit 21 and a phase error signal generation unit 22, one pair for the even data and the other pair for the odd data. In addition, the demodulation unit 20 includes two demultiplexers (DEMUXs) 23. Each of the above oversampled data groups 3 is supplied in parallel to the corresponding data demodulation unit 21 and phase error signal generation unit 22 and is subjected to a mixer process and an LPF process. Next, each of the oversampled data groups 3 is outputted to the corresponding demultiplexer (DEMUX) 23 and is finally outputted in parallel as a data signal 4.

Figure 14:
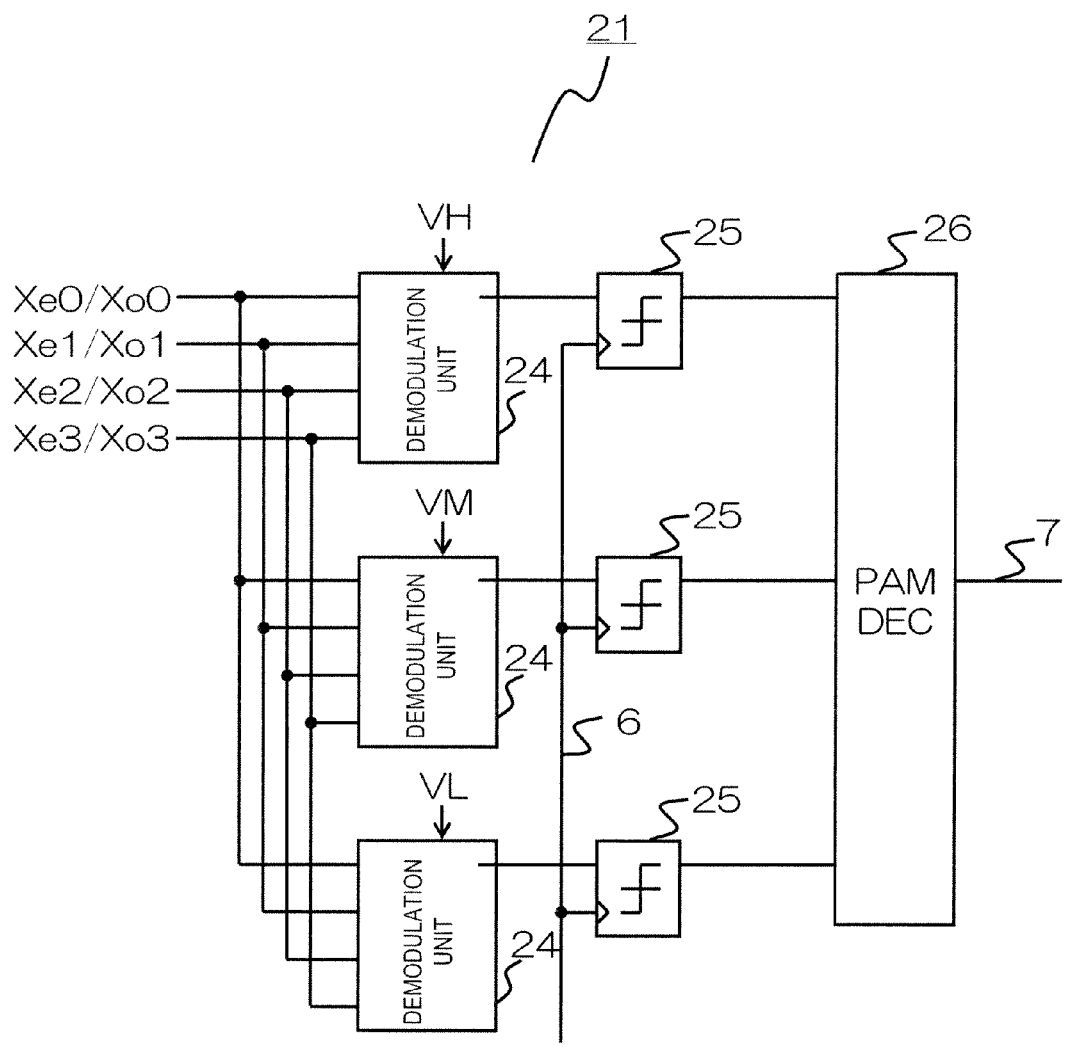
FIG. 14 is a block diagram illustrating a configuration of a data demodulation unit according to the example.

FIG. 14 is a block diagram illustrating a configuration of a data demodulation unit 21 according to the present example. In FIG. 14, the data demodulation unit 21 includes demodulation units 24, determination circuits 25 and a PAM decoder 26. Each of the demodulation units 24 receives and demodulates the corresponding oversampled data 3. Each of the demodulated signals is supplied to a corresponding determination circuit 25 for level determination. In the present example, a demodulation example of a 4-value waveform is illustrated. The 4-value waveform is subjected to binary determination by using one of three thresholds (VH, VM, and VL). Based on the obtained determination results, the PAM decoder 26 executes decoding into a binary signal.

Figure 15:
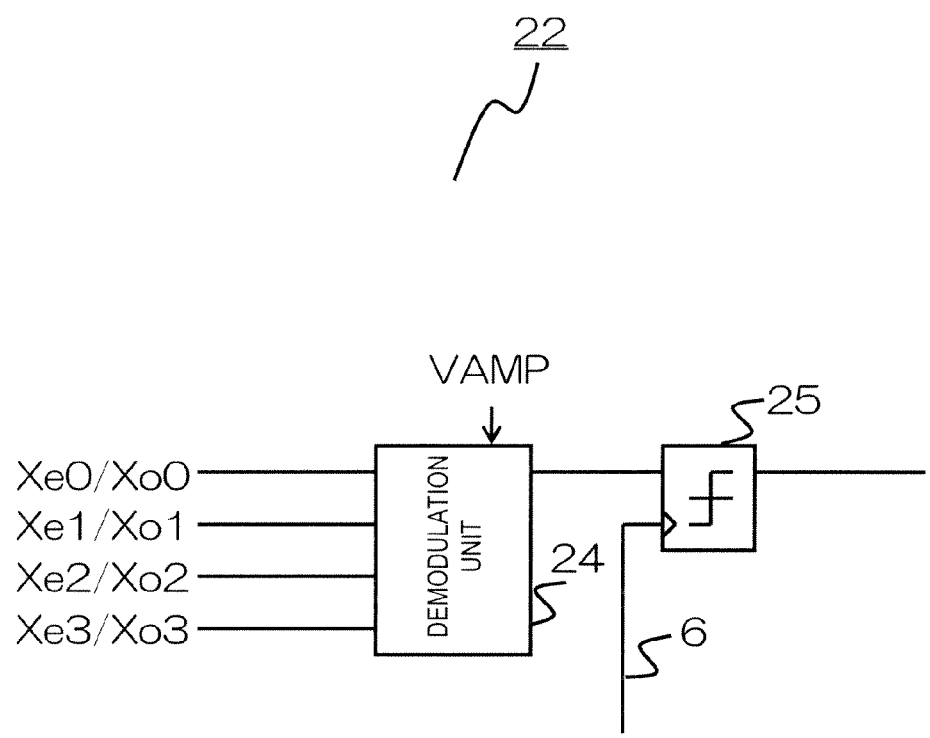
FIG. 15 is a block diagram illustrating a configuration of a phase error signal generation unit according to the example.

FIG. 15 is a block diagram illustrating a configuration of a phase error signal generation unit 22 according to the present example. In FIG. 15, the phase error signal generation unit 22 includes the demodulation unit 24 and a determination circuit 25. In the phase error signal generation unit 22, the demodulation unit 24 executes mixer and LPF processes and shifts a waveform based on the VAMP described in the operation principle. Next, the determination circuit 25 executes data determination and outputs an error signal.

Figure 16:
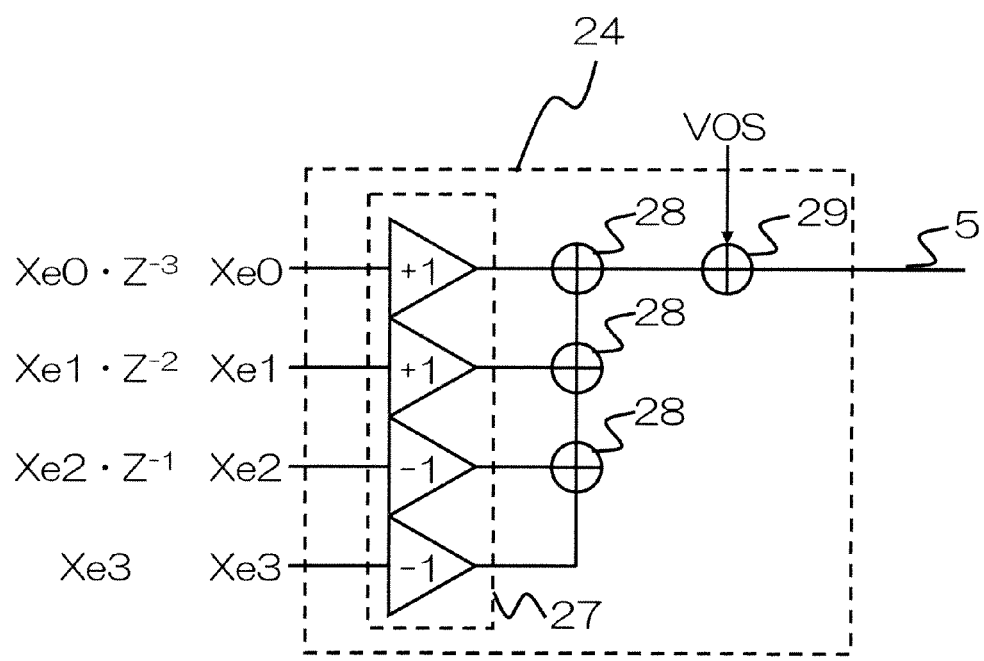
FIG. 16 is a circuit diagram illustrating a configuration of a demodulation unit according to the example.

FIG. 16 is a circuit diagram illustrating a configuration of a demodulation unit 24 according to the present example. FIG. 16 illustrates a configuration of the demodulation unit 24 arranged for the second channel having the I phase (Ch.2(I), the medium frequency band (Inphase) channel). In FIG. 16, the demodulation unit 24 includes a demodulation filter 27 and adder circuits 28 and 29. The supplied four four-times oversampled data 3 is gain-amplified in the demodulation filter 27 by coefficient values in FIG. 17 and is subjected to an LPF process in the adder circuits 28. Next, a given offset voltage VOS is added in the adder circuit 29, and the obtained signal is outputted to a corresponding determination circuit 25.

Figure 18:
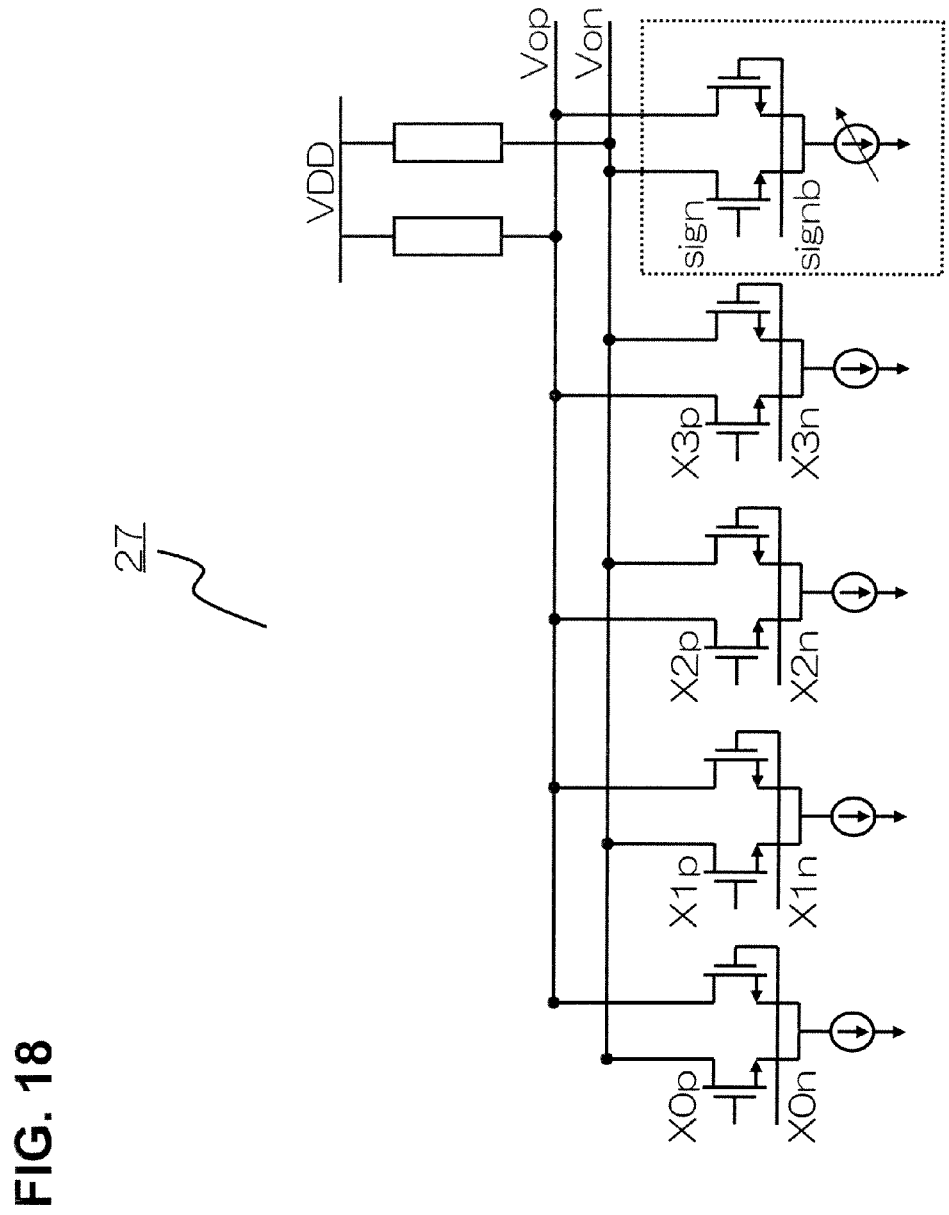
FIG. 18 is a circuit diagram illustrating a configuration of a demodulation filter according to the example.

FIG. 18 is a circuit diagram illustrating a configuration of a demodulation filter 27 according to the present example. FIG. 18 illustrates a configuration of the demodulation filter 27 arranged for the second channel having the I phase (Ch.2(I), the medium frequency band (Inphase) channel). In FIG. 18, the demodulation filter 27 represents 1, 1, −1, and each oversampled data 3 is supplied to a differential input pair and is converted into a current. The symbol of each differential output can be changed depending on whether which of the output node differential pair is connected based on the filter symbol. The four oversampled data 3 is added together as a current, and the current is transmitted and outputted as a voltage via a load resistance. In addition, the offset voltage can be set by inputting a symbol to a differential pair having a variable current source.

In FIG. 4, the phase comparison unit 30 receives the output signals 4 and 5 of the channels Ch.2 (I) and Ch.2 (Q). FIG. 8A is a truth table of clock data recovery UP/DN signals. FIG. 8B is a circuit diagram illustrating a configuration of the phase comparison unit 30 according to the present example. Based on the phase comparison unit 30 in FIG. 8B, the clock phase up/down signals (UP/DN) in FIG. 8A can be obtained. As in a conventional clock data recovery circuit, a low-pass filter such as a digital counter may be inserted around the phase control circuit 40 to control tracking capabilities.

Based on the clock data recovery circuit 60 according to the present example, data carried by two orthogonal carrier waves in a single frequency band is sampled by a VAMP threshold and a zero differential threshold, and the results are subjected to logical operations. In this way, a reception circuit receiving a frequency division multiplexing signal can accurately recover a clock signal as a signal that synchronizes with a data signal, which cannot be achieved by conventional methods. In addition, based on the clock data recovery circuit 60 according to the present example, no edge-detection oversampling clock is required, which is generally required. By simply using data signals and amplitude error outputs of the channels Ch.(I) and Ch.(Q), clock data of all channels can be recovered.

The above description has been made based on exemplary embodiments and examples. However, the present invention is not limited thereto. Various modifications conceivable by those skilled in the art within the scope of the present invention can be made to configurations or details of the present invention. The clock data recovery circuit and the clock data recovery method according to the present invention are applicable to semiconductor devices used for network devices and storage products, such as servers and routers.

The disclosure of the above Non-Patent Document is incorporated herein by reference thereto. Modifications and adjustments of the exemplary embodiments and examples are possible within the scope of the overall disclosure (including claims) of the present invention and based on the basic technical concept of the invention. Various combinations and selections/deletions of various disclosed elements (including each element of each claim, each element of each exemplary embodiment, each element of each drawing, etc.) are possible within the scope of the claims of the present invention.

What is claimed is:

1. A clock data recovery circuit, comprising:
    a demodulation filter that receives a transmission signal transmitted by two orthogonal carrier waves having I and Q phases and executes demodulation to obtain a demodulated wave having an I phase and a demodulated wave having a Q phase from the transmission signal;
    a first determination circuit that determines whether an absolute value of one of the two demodulated waves is greater than an eye opening maximum value at an ideal clock phase of the transmission signal;
    a second determination circuit that determines whether the one demodulated wave is greater than zero;
    a third determination circuit that determines whether the other one of the two demodulated waves is greater than zero; and
    a phase comparison unit that detects whether a phase of a clock signal included in the transmission signal is leading a phase of a data signal included in the transmission signal, based on determination results obtained by the first to third determination circuits.

2. The clock data recovery circuit according to claim 1;
    wherein, when the second determination circuit obtains a determination result, based on whether a determination result obtained by the first determination circuit and a determination result obtained by the third determination circuit are the same, the phase comparison unit detects whether the phase of the clock signal is leading the phase of the data signal.

3. The clock data recovery circuit according to claim 2, further comprising:
    a phase control unit that controls the phase of the clock signal based on a detection result obtained by the phase comparison unit.

4. The clock data recovery circuit according to claim 1, further comprising:
    a phase control unit that controls the phase of the clock signal based on a detection result obtained by the phase comparison unit.

5. The clock data recovery circuit according to claim 4;
    wherein, if the phase comparison unit detects that the phase of the clock signal is leading the phase of the data signal, the phase control unit delays the phase of the clock signal; and
    wherein, if the phase comparison unit detects that the phase of the clock signal is lagging the phase of the data signal, the phase control unit advances the phase of the clock signal.

6. The clock data recovery circuit according to claim 1;
    wherein, when a determination result obtained by the second determination circuit is either true or false, if one of the determination results obtained by the first and third determination circuits is true and the other is false, the phase comparison unit detects that the phase of the clock signal is lagging the phase of the data signal; and wherein, otherwise, the phase comparison unit detects that the phase of the clock signal is leading the phase of the data signal.

7. A clock data recovery method, comprising:

receiving a transmission signal transmitted by two orthogonal carrier waves having I and Q phases and executing demodulation to obtain a demodulated wave having an I phase and a demodulated wave having a Q phase from the transmission signal;

first determining whether an absolute value of one of the two demodulated waves is greater than an eye opening maximum value at an ideal clock phase of the transmission signal;

second determining whether the one demodulated wave is greater than zero;

third determining whether the other one of the two demodulated waves is greater than zero; and detecting whether a phase of a clock signal included in the transmission signal is leading a phase of a data signal included in the transmission signal, based on determination results obtained by the first to third determinings.

8. The clock data recovery method according to claim 7;
wherein, when a determination result is obtained in the second determining, based on whether a determination result obtained in the first determining and a determination result obtained in the third determining are the same, whether the phase of the clock signal is leading the phase of the data signal is detected in the detecting.

9. The clock data recovery method according to claim 8, further comprising:
controlling the phase of the clock signal based on a detection result obtained in the detecting.

10. The clock data recovery method according to claim 7, further comprising:
controlling the phase of the clock signal based on a detection result obtained in the detecting.

11. The clock data recovery method according to claim 10;
wherein, if it is detected that the phase of the clock signal is leading the phase of the data signal in the detecting, the phase of the clock signal is delayed in the controlling; and
wherein, if it is detected that the phase of the clock signal is lagging the phase of the data signal in the detecting, the phase of the clock signal is advanced in the controlling.

* * * * *